(12) United States Patent
Waneck (10) Patent No.: US 12,184,618 B2
(45) Date of Patent: Dec. 31, 2024

(54) ACCESS CONTROL FOR PRIVATE MESSAGES

(71) Applicant: Connexcom AG, Baar (CH)

(72) Inventor: Peter Waneck, Oberägeri (CH)

(73) Assignee: WIEBKE BREMER, Lüneburg (DE)

( * ) Notice: Subject to any disclaimer, the term of this patent is extended or adjusted under 35 U.S.C. 154(b) by 79 days.

(21) Appl. No.: 17/641,982

(22) PCT Filed: Sep. 10, 2020

(86) PCT No.: PCT/EP2020/075318
§ 371 (c)(1),
(2) Date: Mar. 10, 2022

(87) PCT Pub. No.: WO2021/048273
PCT Pub. Date: Mar. 18, 2021

(65) Prior Publication Data
US 2022/0337559 A1  Oct. 20, 2022

(30) Foreign Application Priority Data
Sep. 10, 2019 (EP) ..................... 19196377

(51) Int. Cl.
*H04L 9/40* (2022.01)
*H04W 12/02* (2009.01)
(52) U.S. Cl.
CPC ............. *H04L 63/04* (2013.01); *H04W 12/02* (2013.01)
(58) Field of Classification Search
CPC ...................................... H04L 63/04
See application file for complete search history.

(56) References Cited

U.S. PATENT DOCUMENTS

2013/0074195 A1   3/2013   Johnston
2018/0083978 A1   3/2018   Pantazelos
(Continued)

FOREIGN PATENT DOCUMENTS

CN   106575344 A   4/2017
CN   108063816 A   5/2018
(Continued)

OTHER PUBLICATIONS

International Search Report and Written Opinion of the International Searching Authority for International Patent Application No. PCT/EP2020/075318 mailed Oct. 23, 2020, 12 pages.
(Continued)

*Primary Examiner* — Simon P Kanaan
(74) *Attorney, Agent, or Firm* — Merchant & Gould P.C.

(57) ABSTRACT

A computer-implemented method is for controlling access to a private message (1) of a user of a first terminal (4) to a user of a second terminal (5). The method includes detecting (8) the private message (1) and the receiver (3) on the first terminal (4) and ascertaining (9) the address of the second terminal (5) based on the detected receiver. A request (13, 16) of the status of an access control is transmitted from the first terminal (4) to the second terminal (5). A private message (1) is transmitted from the first terminal (4) to the second terminal (5) only if the request (16) has been answered by the second terminal (5) with a status notification (19) and the access control (17) at the second terminal (5) is active according to the status notification (19).

11 Claims, 7 Drawing Sheets (56) References Cited

U.S. PATENT DOCUMENTS

| | | | | |
|---|---|---|---|---|
| 2018/0160301 A1* | 6/2018 | Kwon | ................... | H04W 4/06 |
| 2020/0382367 A1* | 12/2020 | Rankin | ................... | H04L 67/12 |
| 2020/0382982 A1* | 12/2020 | Yao | ................... | H04W 24/10 |
| 2022/0286848 A1* | 9/2022 | Rodriguez | ......... | A61N 1/37252 |

FOREIGN PATENT DOCUMENTS

| | | | |
|---|---|---|---|
| EP | 1703431 | A2 | 9/2006 |
| EP | 2761823 | B1 | 11/2017 |
| EP | 3416079 | A1 | 12/2018 |
| KR | 1020100126850 | A | 12/2010 |
| RU | 2359311 | C2 | 6/2009 |
| RU | 2558617 | C2 | 8/2015 |
| WO | 2018229246 | A1 | 12/2018 |

OTHER PUBLICATIONS

Extended European Search Report for European Patent Application No. 19196377.6 mailed Mar. 9, 2020, 5 pages.
Russian Office Action received for RU Application No. 2022109155/28 on Jan. 11, 2024, 10 pgs.
Chinese Office Action received for CN Application No. 202080078172.4 on Nov. 9, 2023, 21 pgs.
Korean Office Action received for KR Application No. 10-2022-7011691 on Nov. 2, 2024, 19 pgs.

* cited by examiner

ACCESS CONTROL FOR PRIVATE MESSAGES

This application is a National Stage Application of PCT/EP2020/075318, filed 10 Sep. 2020, which claims benefit of European Patent Application Serial No. 19196377.6, filed 10 Sep. 2019 and which applications are incorporated herein by reference. To the extent appropriate, a claim of priority is made to each of the above disclosed applications.

BACKGROUND OF THE INVENTION

The invention relates to a computer-implemented method for access control to a private message of a user of a first terminal to a user of a second terminal and corresponding computer program products for the first and the second terminal.

In connection with the exchange of private messages, solutions are already known for many aspects. For example, it has meanwhile become common that private messages between the two participating terminals are transmitted in an encrypted manner ("end-to-end encryption"). As a result, it becomes considerably harder or practically impossible for third parties, who can also read the data communication between the terminals—for example as intermediaries along the data connection—to recognize the content of private messages. Independently of that, the terminals are usually secured with respect to third parties who can predominantly gain physical access to the respective terminal. For this purpose, the private messages are usually saved on both terminals only in an encrypted manner. Decryption requires an authentication of the user, for example on the basis of biometric features such as a fingerprint or facial recognition and/or on the basis of an unlock code.

A further aspect is the reading of private messages by unauthorized third parties. In this case, the above-mentioned security mechanisms are overcome in that the authorized user of one of the two terminals reads the content of the private message and, to do that, displays the same e.g. on a screen of the terminal. In this scenario, the third party attempts to gain visual access to the same screen and can therefore likewise read the content of the private message. A similar situation results should the authorized user like to freely give a third party access to a terminal for another purpose and authenticates themselves for this. At the same time, they would also like to prevent this—in itself legitimate—access from extending to the content of private messages. WO 2018/229246 A1 suggests continuous monitoring of the users of the terminal to secure against such access. In this case, during existing access to the terminal, access to private data can be restricted, for example if more than one user is detected.

The measures suggested in WO 2018/229246 A1 initially help predominantly the user of the relevant terminal, i.e. they who would like to restrict access to their private data, which are saved on their terminal, independently of the other data which may likewise be saved on their terminal and to which they would possibly want to allow third parties temporary access. That is to say, these measures protect predominantly the recipient of private messages from third parties inadvertently obtaining access to the private messages received by them or even from learning of the existence of these messages.

US 2018/0083978 A1 shows a system and method for conditional delivery of electronic contents such as images or video-stream contents via a communications network.

EP 2 761 823 B1 shows methods and devices for authenticating electronic messages.

US 2013/0074195 A1 shows a method for access to e-mail messages from a control system. The method includes requesting access to e-mail message contents of a user, which are saved in the control system, determining whether the user is logged into the control system and activated by the control system, and authenticating the user if the user is logged into the control system and activated by the control system.

EP 1 703 431 A2 shows a display device and a corresponding control, which should prevent information displayed on display means from being spied on.

One aspect which is often neglected in the known solutions is the interest of the sender of a private message, that the private message sent by them cannot be read by unauthorized third parties on the terminal of the recipient. The encryption of the private message, so that only the authorized recipient can decrypt it, only offers limited protection in this regard. At least after the authorized recipient has decrypted the message, the protection of the content of this message is dependent on the further precautions at the terminal of the recipient. The sender typically has no influence on these precautions with the above-mentioned methods.

SUMMARY OF THE INVENTION

It is an object of the invention to improve the security of the sender of a private message with respect to undesired access on the terminal of the recipient.

The method according to the invention of the type specified at the outset comprises the steps:
  recording the private message and the recipient on the first terminal;
  determining an address of the second terminal on the basis of the recorded recipient;
  sending a query about the status of an access control from the first terminal to the second terminal;
  sending a private message from the first terminal to the second terminal only if the query was answered by the second terminal with a status message and, according to the status message, the access control is active at the second terminal.

The method therefore provides that the private message from the sender is withheld (more precisely: by their terminal; here termed the first terminal), in the event that the recipient has not activated an access control, which is expected by the sender, on their terminal (here termed the second terminal). In this manner, it is possible for the sender to ensure that the private message is only transmitted to a second terminal with active access control, and thus the security of the content of the private message and ultimately the security of the sender, who expects or is dependent upon the confidentiality of this content, is improved.

It may optionally be provided that the first terminal outputs an error message and deletes the message if, according to the status message, the access control on the second terminal is permanently inactive. A permanently inactive access control exists for example if the second terminal does not fulfil the technical requirements for an access control (e.g. missing software and/or hardware components) or if the access control on the second terminal had been permanently deactivated (e.g. by a corresponding system configuration). In such cases, it is not possible to predict whether and when transmission of the private message will be possible without compromising security, which is why the message can be deleted. In order to inform the user of the first terminal that the recipient does not have access to the private message, an error message is output at the first terminal. This error message may expediently contain a reason, so that the sender has the option to contact the recipient via a different channel and for example to request activation of the access control.

Furthermore, it may for example be provided that the first terminal starts a timer with a predefined duration, if, according to the status message, the access control is temporarily inactive at the second terminal, and after the timer has run out, sends a new query about the status of an access control to the second terminal. As a result, it is achieved that the private message does not get to the second terminal during the inactivity of the access control, when, during this time period, it would be exposed, with a relatively high likelihood, to unauthorized access. The user of the second terminal can temporarily deactivate or switch off the access control. This could for example be used to enable access to private data on the second terminal to authorized third parties. The authorization of the relevant third parties exists in this case, however, for certain private data. Before they enable such access, the user of the second terminal will therefore convince themselves about which private data are saved on the second terminal and if appropriate delete the private data to which the relevant third party should not have access, and only deactivate the access control temporarily after that. If, during the third party's access, new private messages arrive at the second terminal, the user thereof would not have any option to check these beforehand and hide them from the third party if necessary. The above-mentioned variant of the present method alleviates this problem, in that private messages are withheld by the sender for the duration of the inactive access control. In this case, the first terminal attempts redelivery after the predefined duration, subject to the condition that the access control at the second terminal is then active. The predefined duration may for example be 1 minute. The timer for monitoring the predefined duration is located at the first terminal, i.e. under the control of the sender of the private message. As long as new delivery attempts are undertaken, the first terminal does not output any error messages. The user of the first terminal may be informed by a suitable status indicator that the private message has not yet been delivered. As soon as the user of the second terminal reactivates the access control, they will therefore receive the private message, i.e. as soon as possible without compromising the security of the private message.

The method can optionally relate to a certain form of the access control, which is required at the second terminal before the first terminal sends the private message. In detail, when the access control is active at the second terminal, access to a private message received from the first terminal may be restricted or unrestricted on the second terminal, wherein the method comprises the following steps in the case of unrestricted access:

- recording a video signal (generally referring to a single picture or a photograph or a motion picture or a film) using a camera of the second terminal;
- carrying out face detection using the recorded video signal;
- continuous monitoring of the number of faces determined in the recorded video signal by the face detection, wherein access is restricted if the number of faces is greater than one.

It can therefore be ensured that unrestricted access is only ensured for as long as only one person is detected in the viewing field of the camera (i.e. the region which the camera records). As soon as the face of a second person enters into the viewing field of the camera, access is restricted, i.e. the second terminal is switched to restricted access. After that, the users of the second terminal furthermore have access to the other data, which are not marked as private and are saved on the second terminal. In this manner, it is made more difficult for a third party to spy on the private data. For example, private contacts and all references to the communication with the private contacts can be kept secret from people other than the authorized user of the second terminal. The marking of data as private can take place through the user and is saved on the second terminal. For example, the user may mark an existing contact as "private" or they create a new contact with the reference "private". Subsequently, the second terminal treats all data linked with this contact as private data, e.g. earlier calls, text messages, e-mails, chat messages, the contact information itself, or images or videos linked with the contact. The private message received from the first terminal is in any case, i.e. without interaction with the user being required, assigned to the private data and is therefore not accessible in the case of restricted access.

If the second terminal has a screen for displaying private and other data, the private data may optionally be hidden completely in the case of restricted access and only the other data are displayed. That is to say, the access to the private data is not only restricted by blacking out, but rather in such a manner that in the case of restricted access, no indication of the existence of these data can be seen. In particular, unauthorized third parties should not be able to recognize that they only have restricted access.

In this context, it may for example additionally be provided that in the event of unrestricted access, a visual indication of unrestricted access is displayed. Thus, in the case of unrestricted access, a user can recognize that both other and private data are being displayed at that time and they therefore have complete and free access to all data. The visual indication may be e.g. a green frame on the screen. Restricted access is therefore recognizable for the authorized user due to the absence of the visual indication; however, for the unauthorized user, the restricted access is not recognizable, because this user does not know about or expect the visual indication.

According to a further variant, during restricted access, events relating to private data are displayed in a restricted (e.g. censored) form on the screen. This function should make it possible for the user of the second terminal to be notified about events connected to private data (e.g. a message from a private contact), even in the case of restricted access (e.g. if the second terminal is not used or is not being used alone). For example, a call of a private contact may be displayed as "unknown number" if e.g. a smartphone is lying unconcealed on the table.

With regards to the start of continuous monitoring, it is beneficial if in the case of active access control, authentication of a user is carried out to obtain unrestricted access, wherein prior to approval of unrestricted access, a video signal is recorded using the camera of the second terminal, face detection is carried out using the recorded video signal and the number of faces in the recorded video signal is determined, wherein approval only succeeds if the number of faces is exactly one. Even in the case of successful authentication, unrestricted access is only approved if no observers and potential shoulder surfers are detected.

Furthermore, it may optionally be provided that the authentication comprises biometric authentication, particularly face identification and/or iris identification. In this case, the authentication and the determination of the number of the faces can be carried out on the basis of the same image data. Alternatively or additionally, other factors can of course also be used for authentication, e.g. a password or fingerprint.

In a further variant of the present method, the face identification can be repeated regularly or randomly in parallel with checking the number of faces. As a result, it is possible to prove that an unauthorized user, who appears in the viewing field of the camera of the second terminal at the same moment as when the authorized user leaves the viewing field of the camera, obtains unrestricted access.

The method features relating to the first terminal can for example be realized in the context of the present invention as a computer program product, which can be loaded directly into the internal memory of a digital computer and comprises software code sections, using which the steps to be executed on the first terminal according to one or more of the described variants are executed when the computer program runs on a computer.

The method features relating to the second terminal can for example be realized in the context of the present invention as a computer program product, which can be loaded directly into the internal memory of a digital computer and comprises software code sections, using which the steps to be executed on the second terminal according to one or more of the described variants are executed when the computer program runs on a computer.

BRIEF DESCRIPTION OF THE DRAWINGS

The invention is explained further in the following on the basis of particularly preferred exemplary embodiments, to which it should not be limited, however, and with reference to the drawings. In detail, in the figures.

DETAILED DESCRIPTION OF THE PREFERRED EMBODIMENT

Figure 1:
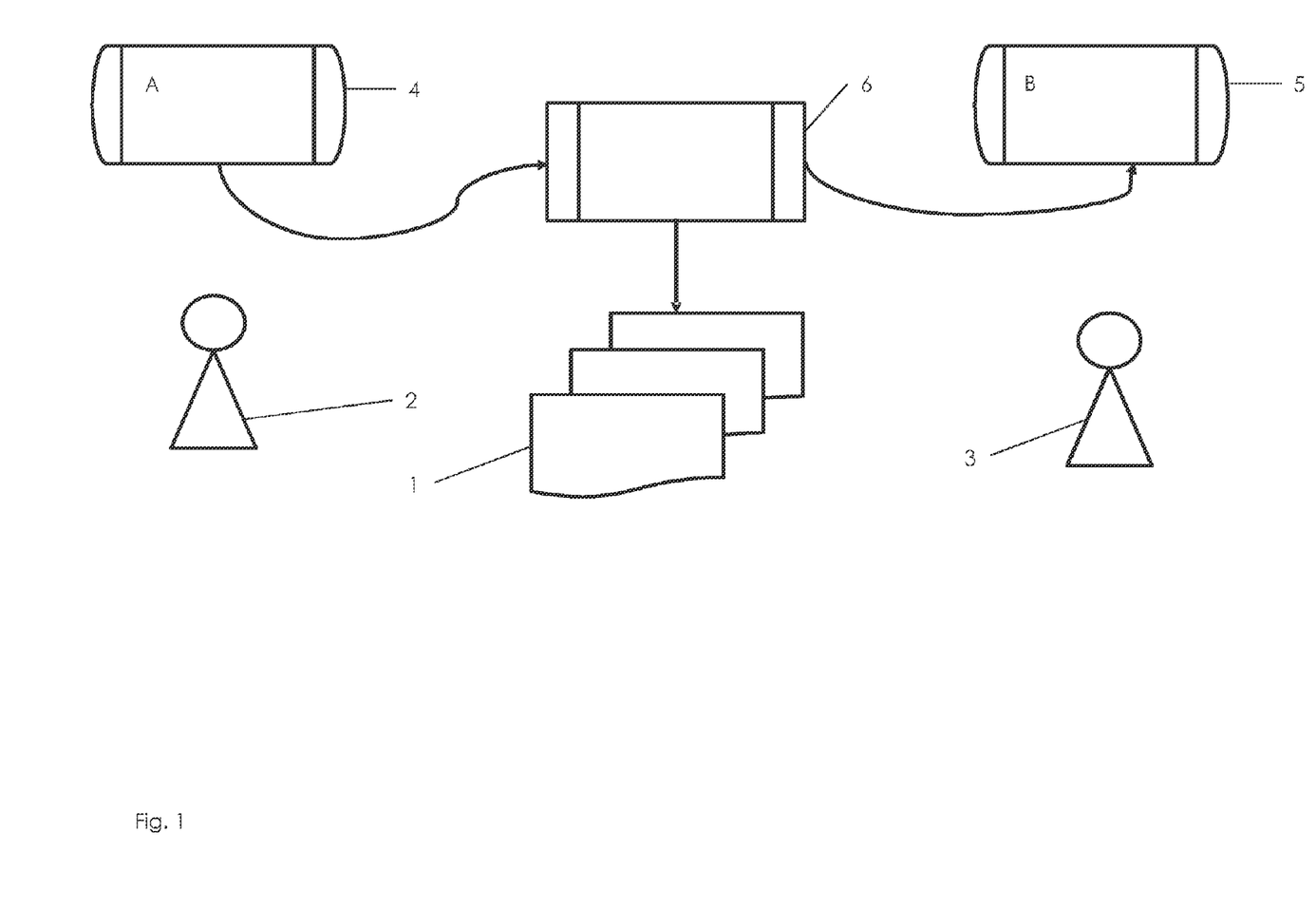
FIG. 1 schematically shows a data flow chart of a private message from a sender to a recipient.

FIG. 1 shows the data flow of a private message 1 between a sender 2 and a recipient 3. The sender 2 is the user of a first terminal 4. The recipient 3 is the user of a second terminal 5. The private message 1 is transmitted in the form of one or more encrypted data packets 6 from the first terminal 4 to the second terminal 5, e.g. via the Internet. Before the private message 1 is transmitted, the present method provides a plurality of steps, which are explained more precisely on the basis of the exemplary procedure illustrated in FIG. 2.

Figure 2:
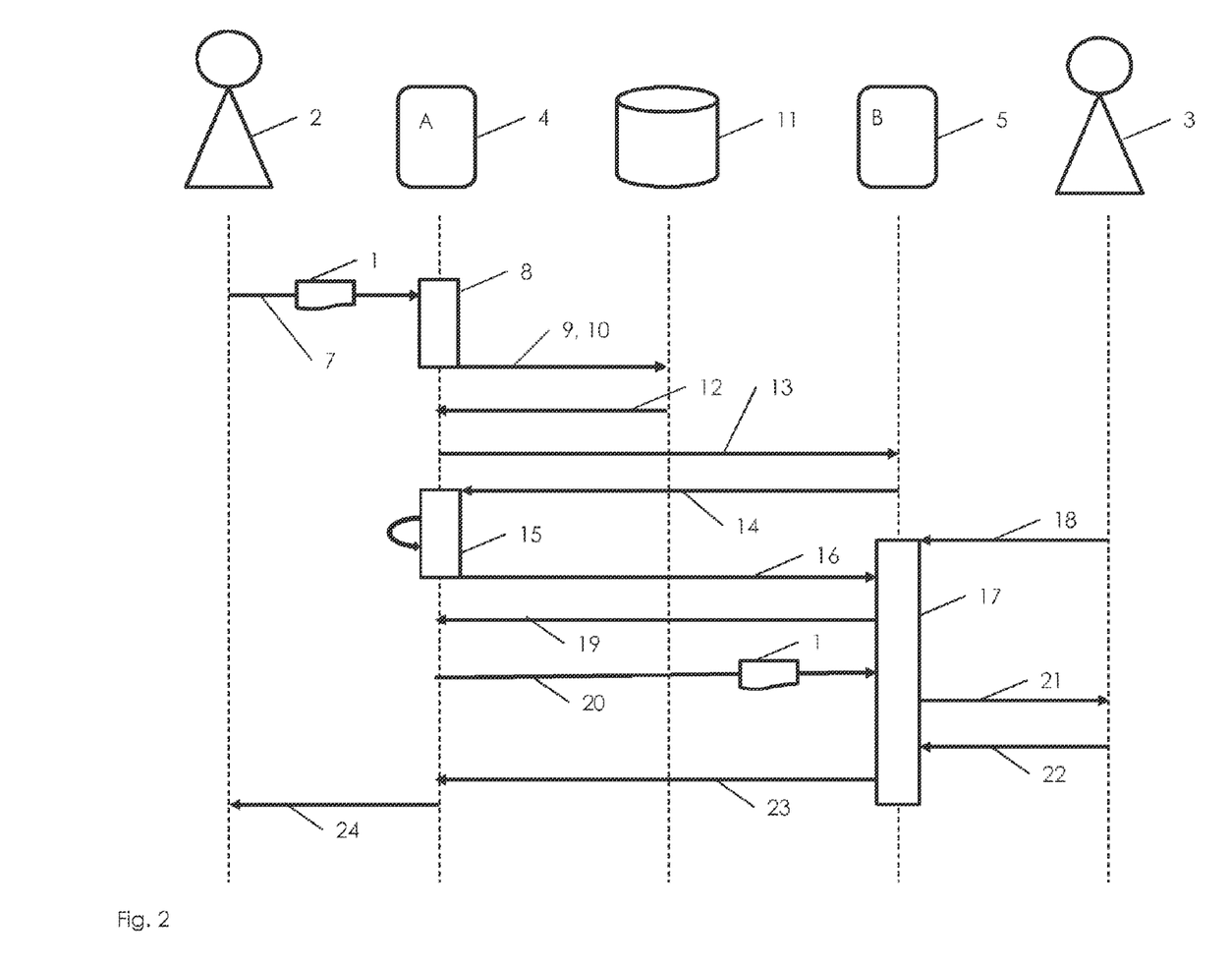
FIG. 2 schematically shows a sequence diagram of a method for access control to a private message of a user of a first terminal to a user of a second terminal.

The sequence diagram in FIG. 2 shows the steps for an exemplary execution of the method according to the present application in more detail. It relates to the exchange of a private message 1 between the sender 2 and the recipient 3 by means of the terminals 4, 5. Initially, the private message 1 is recorded 7 together with an identification of the recipient 3 at the first terminal 4. In this case, the sender 2 indicates that it would like to transmit a private message 1. Additionally, the sender 2 may optionally determine desired parameters of an access control on the recipient 3 side. Typically, the sender 2 at the first terminal 4 will have likewise activated a corresponding access control. Therefore, the sender 2 will first be authenticated with respect to the first terminal 4 prior to the start of the recording of a private message. The identification of the recipient 3 may for example take place by selecting from a contact list or an address book. The parameters of the access control can be determined specifically for the private message 1 or for all private messages. These parameters may for example include a temporal limitation of the access or storage on the recipient 3 side. In addition, it is possible to determine by means of parameters of this type, whether the recipient 3 can forward the private message 1 or else the access control can fundamentally prevent such forwarding at the second terminal 5. The private message 1 and the associated parameters of the access control can be stored in a secured (particularly encrypted) buffer memory in the first terminal 4 until the completion of the method.

During or after the recording 8 of the private message 1 and the identification of the recipient 3, at the earliest when an identification of at least one recipient is recorded, the first terminal determines 9 an address of the second terminal 5 on the basis of the recorded identification of the recipient 3. To this end, a query 10 is for example sent to an address database 11. The address database 11 may be present locally on the first terminal 4 or be provided by a connected service on a remote server. As a response to the query 10, the address database 11 transmits the sought address 12 of the second terminal 5 to the first terminal 4.

Using the address 12 that is now present, the first terminal 4 sends a query 13 about the status of access control to the second terminal 5. The query 13 optionally also contains the parameters of the access control desired by the sender 2. In the example shown in FIG. 2, the access control on the second terminal 5 is temporarily inactive at the time of the first query 13. The second terminal 5 sends a corresponding status message 14 to the first terminal 4. According to the status message 14, the access control on the second terminal 5 is temporarily inactive. The first terminal 4 then starts a timer 15 for the predefined duration of 1 minute. After the timer 15 has run out, the first terminal 4 sends a new query 16 about the status of access control to the second terminal 5. In the meantime, the recipient 3 has activated 18 the access control 17 on the second terminal 5. The second status message 19, which is sent from the second terminal 5 as a response to the second query 16 to the first terminal 4, therefore proves that the access control 17 on the second terminal 5 is active. If the sender 2 has defined parameters of the access control, the fulfilment of these parameters by the second terminal 5 is likewise checked and the individual parameters are confirmed or denied, if appropriate, in the status message 19.

As the second query 16 was therefore answered with a status message 19, according to which the access control 17 on the second terminal 5 is active (and—if present—all parameters of the access control are fulfilled as requested), the first terminal 4 sends 20 the private message 1 to the second terminal 5. The second terminal 5 notifies 21 the recipient 3 about the received private message 1. Therefore, in the case of active access control 17 and correspondingly protected environment, the recipient 3 can access 22 the private message 1 on the second terminal 5 and read the same. As soon as the second terminal 5 registers the access, it can send a read notification 23 to the first terminal 4. The read notification 23 may contain the time of the access 22. The first terminal 4 may then inform 24 the sender 2 that the private message 1 from the recipient 3 was received. At this time, the private message 1 can for example be deleted by the first terminal 4. In addition, it may be provided that the sender 2 can even delete the private message 1 on the second terminal 5 by remote control.

Figure 3:
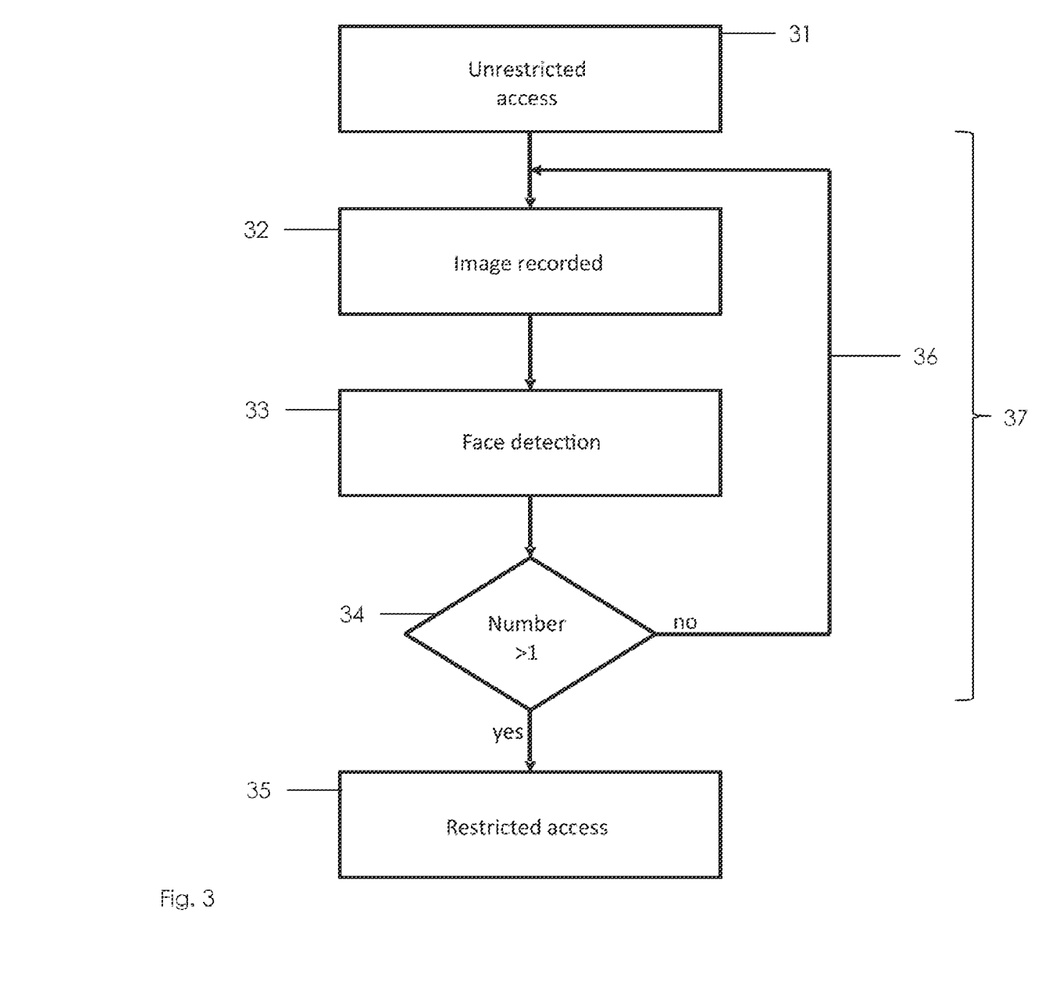
FIG. 3 schematically shows the second terminal.
Figure 5A:
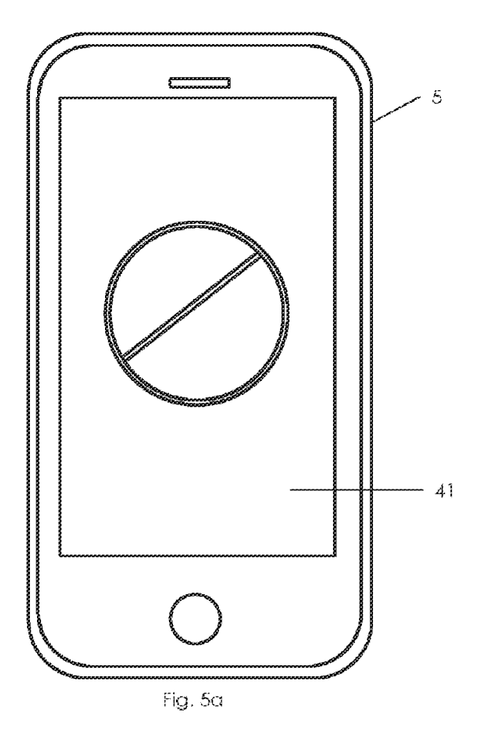
FIG. 5a schematically shows a mobile terminal during access.
Figure 5B:
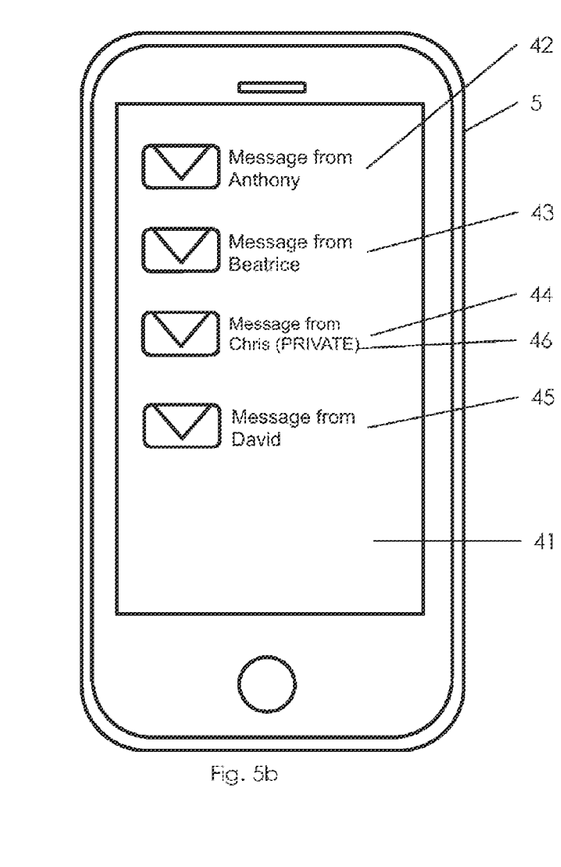
FIG. 5b schematically shows a mobile terminal during unrestricted access.
Figure 5C:
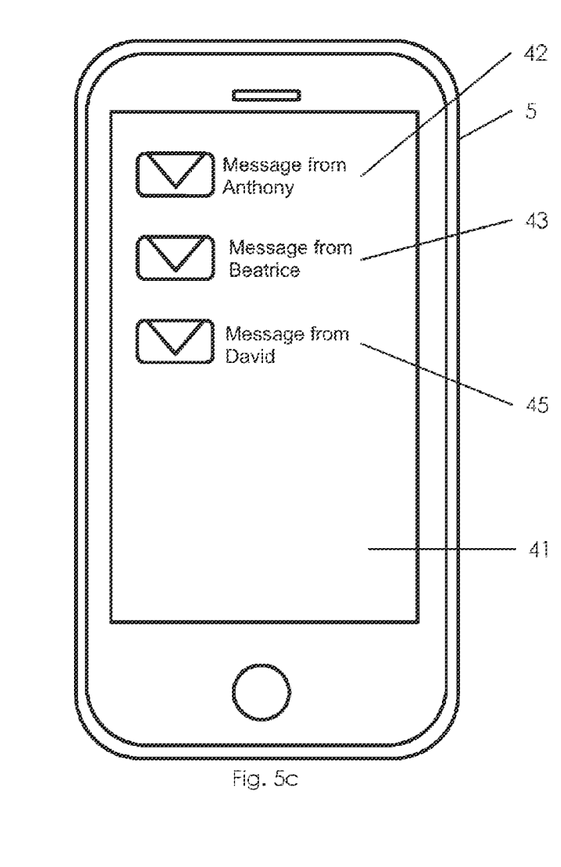
FIG. 5c schematically shows a mobile terminal during access.

The FIGS. 3 to 6b illustrate an example for the access control 17 on the second terminal 5 in detail:

FIG. 3 shows the procedure of a computer-implemented method for access control of the second terminal 5 (cf. FIGS. 5a-c). Private data and other data are saved on the terminal 5. The access to the private data can be restricted or unrestricted.

Starting from unrestricted access 31 (cf. FIG. 5b), the method shown in FIG. 3 comprises the following steps, which are illustrated as a function block. First, a video signal is recorded 32 using a camera of the second terminal 5 (cf. FIG. 6a-b). Subsequently, face detection is carried out 33 using the recorded video signal. After the completion of the face detection, the number of faces determined in the recorded video signal by the face detection is checked 34. If 34 the number of faces is greater than one (cf. FIG. 6b), access is restricted 35 (cf. FIG. 3c). Otherwise 36, the next video signal is recorded, so that during the unrestricted access, continuous monitoring 37 of the number of faces in the viewing field of the camera takes place. As soon as the access is restricted, the monitoring can be stopped.

If the second terminal 5 has a screen for displaying private and other data, the private data are hidden completely in the case of restricted access and only the other data are displayed. In the case of unrestricted access, a visual indication of the unrestricted access is displayed on the screen in the form of a coloured (e.g. green) frame. If, during restricted access, an event relating to private data occurs, the event is displayed in a restricted form on the screen.

Figure 4:
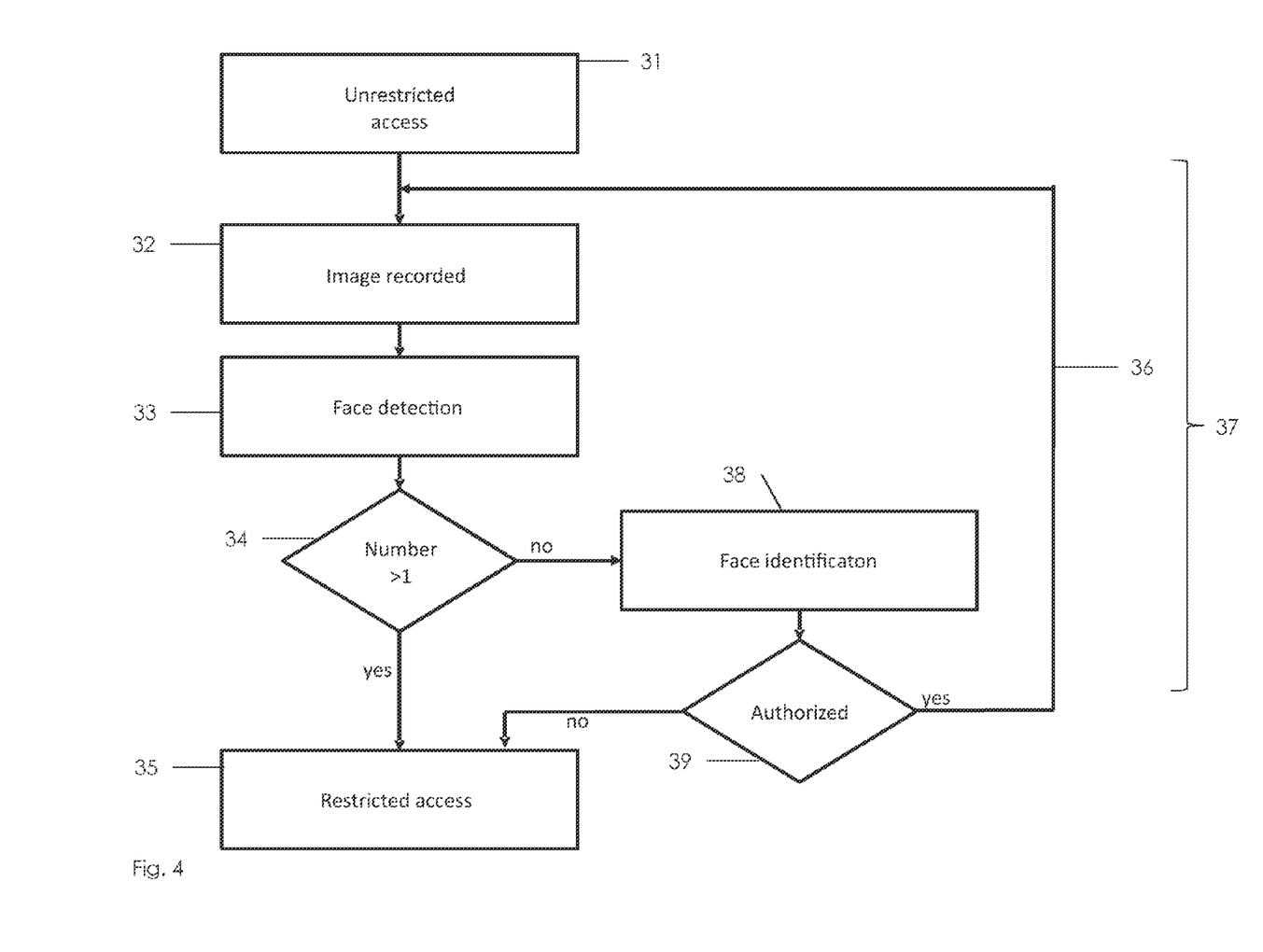
FIG. 4 schematically shows the method according to FIG. 3.

FIG. 4 shows an extended variant of the access control 17 on the second terminal 5. In this case, face identification 38 is additionally carried out during the monitoring 37. A check 39 of the authorization of the user, i.e. the recipient 3, follows. If the user is not authorized, the access is restricted 35. The illustration in FIG. 4 is simplified; the face identification 38 may for example only be carried out randomly or e.g. during every tenth pass of the check 37, in order to save the resources of the second terminal 5 (CPU time, battery).

According to a further variant of the access control 17 on the second terminal 5, a biometric authentication of a user can be carried out using face identification and optionally iris identification to obtain unrestricted access. In this case, prior to approval of unrestricted access, a video signal is recorded using the camera of the second terminal 5, face detection is carried out using the recorded video signal and the number of faces in the recorded video signal is determined. Subsequently, the approval only takes place if the number of faces is exactly one.

In FIGS. 5a-c, the various states of the second terminal 5 are illustrated, which can be assumed in the context of the application of the present method. The second terminal 5 is a smartphone with a screen 41 in this example. In FIG. 5a, the second terminal 5 is illustrated with blocked access. A generic symbol is displayed on the screen 41, which symbolizes the access lock and makes it recognizable. In this state, in general, no access to the data saved on the second terminal 5 is allowed; in particular, no personal data of a user of the second terminal 5 is displayed. If necessary, technical data (such as the time, signal, network information, etc.) can be displayed. If an authorized user is authenticated, e.g. in that they prove their identity, and are successfully authenticated, the second terminal 5 changes in the usual manner directly to a state with unrestricted access to all of the data saved on the second terminal 5. This state is illustrated in FIG. 5b. In this state, messages from four contacts, namely a first message 42 from contact "Anthony", a second message 43 from the contact "Beatrice", a third message 44 from the contact "Chris" and a fourth message 45 from the contact "David", are displayed on the screen 41 of the second terminal 5. The contact "Chris" is marked as a private contact. The third message 44 is therefore displayed with the visual indication 46 "PRIVATE"; due to the indication 46, the user of the second terminal 5 can recognize that an unrestricted access is granted.

As soon as more than one face is recognized in the video signal of a camera in the context of the access control 17 actively executed on the second terminal 5, the second terminal 5 changes to a state with restricted access. This state is illustrated in FIG. 5c. In this state, the first message 42, the second message 43 and the fourth message 45 are displayed. The third message 44 originates from the contact "Chris", who is marked as private, and is therefore likewise marked as private and thus belongs to the private data. A private message transmitted according to the present method, which was only transmitted under the condition of active access control 17 to the second terminal 5, is in any case treated as private and therefore belonging to the private data. In the restricted access illustrated in FIG. 5c, no indication of the content or the existence of the private third message 44 is displayed. An observer, who observes the screen 41 together with the user, therefore does not learn of the existence of the third message 44. After the visual indication 46 is also hidden, the observer also cannot recognize that the access is restricted at the time.

Figure 6A:
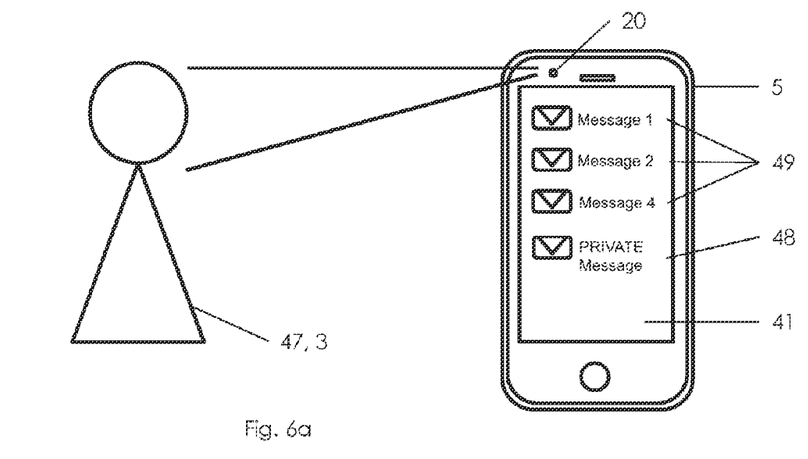
FIG. 6a schematically shows a use case for unrestricted access to a mobile terminal.
Figure 6B:
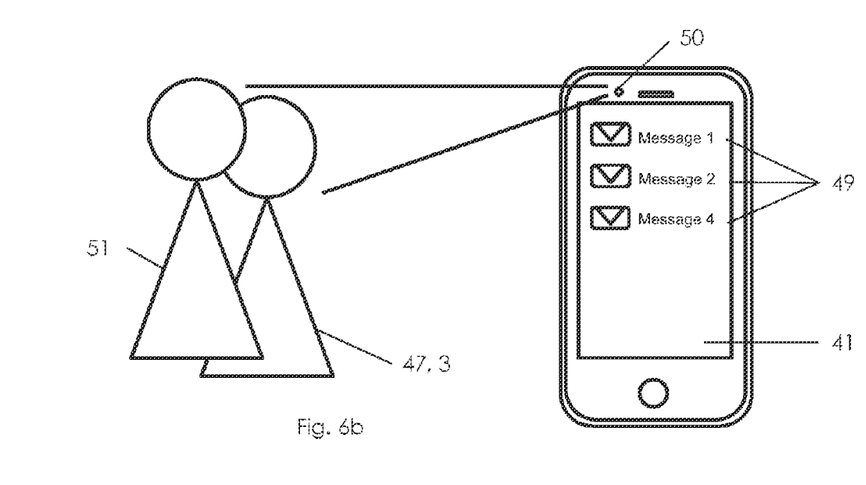
FIG. 6b schematically shows a use case for unrestricted access to a mobile terminal.

FIGS. 6a and 6b show the use cases corresponding to the states according to FIGS. 5b and 5c. In FIG. 6a, a first use case is shown, in which an authorized user 47, namely the user 3, uses the second terminal 5. The second terminal 5 has already been unlocked and is in a state with unrestricted access to private data 48 and other data 49. Using a front camera 50 of the second terminal 5, which is arranged on the same side as the screen 41, an image is repeatedly recorded and the number of faces in the recorded image is detected (cf. FIG. 3). In the first use case, only the authorized user 47 is located in the viewing field of the front camera 50, so that during each check, only one face is detected and thus the unrestricted access is maintained.

A second use case is shown in FIG. 6b. In this case, an observer 51 steps to the side of the authorized user 47 and into the viewing field of the front camera 50. The check recognizes immediately that the number of the recognized faces is greater than one and switches the second terminal 5 into the state with restricted access (cf. FIG. 5c). Only the other data 49 are still displayed on the screen. All private data 48 were hidden from the display, so that the existence and content thereof is hidden from the observer 51.

The invention claimed is:

1. A computer-implemented method for access control to a private message of a user of a first terminal to a user of a second terminal, the method comprising the steps:

recording the private message and a recipient on the first terminal;

determining an address of the second terminal based on the recorded recipient;

sending a query about a status of access control from the first terminal to the second terminal;

sending the private message from the first terminal to the second terminal only if the query was answered by the second terminal with a status message and, according to the status message, access control is active at the second terminal.

2. The method according to claim 1, wherein the first terminal outputs an error message and deletes the private message if, according to the status message, the access control on the second terminal is permanently inactive.

3. The method according to claim 1, wherein the first terminal starts a timer with a predefined duration, if according to the status message, the access control is temporarily inactive at the second terminal, and after the timer has run out, sends a new query about the status of an access control to the second terminal.

4. The method according to claim 1, wherein, when the access control is active at the second terminal, access to a private message received from the first terminal is restricted or unrestricted on the second terminal, comprising the following steps in the case of unrestricted access:

recording a video signal using a camera of the second terminal;

performing face detection using the recorded video signal;

continuous monitoring of a number of faces determined in the recorded video signal by the face detection, wherein access is restricted if the number of faces is greater than one.

5. The method according to claim 4, wherein the second terminal has a screen for displaying the private message, and wherein the private message is hidden completely in the case of restricted access.

6. The method according to claim 5, wherein in the event of unrestricted access, a visual indication of unrestricted access is displayed.

7. The method according to claim 5, wherein, during restricted access, events relating to private messages are displayed in a restricted form on the screen.

8. The method according to claim 4, wherein in the case of active access control, authentication of a user is carried out to obtain unrestricted access, wherein prior to approval of unrestricted access, a video signal is recorded using the camera of the second terminal, face detection is carried out using the recorded video signal and the number of faces in the recorded video signal is determined, wherein approval only occurs if the number of faces is exactly one.

9. The method according to claim 8, wherein the authentication comprises biometric authentication.

10. The method according to claim 9, wherein the biometric authentication is face identification and/or iris identification.

11. A non-transitory computer program product for access control to a private message of a user of a first terminal to a user of a second terminal, wherein the non-transitory computer program product is loaded directly into an internal memory of a digital computer and comprises software code sections, wherein the following steps are executed when the computer program runs on a computer;

recording the private message and recipient;

determining an address of the second terminal based on the recorded recipient;

sending a query about a status of access control to the second terminal; and sending the private message to the second terminal only if the query was answered by the second terminal with a status message and, according to the status message, access control is active at the second terminal.

* * * * *